June 4, 1963 — S. H. BINGHAM — 3,092,040
MONORAIL CONSTRUCTIONS
Filed Jan. 22, 1960 — 3 Sheets-Sheet 1
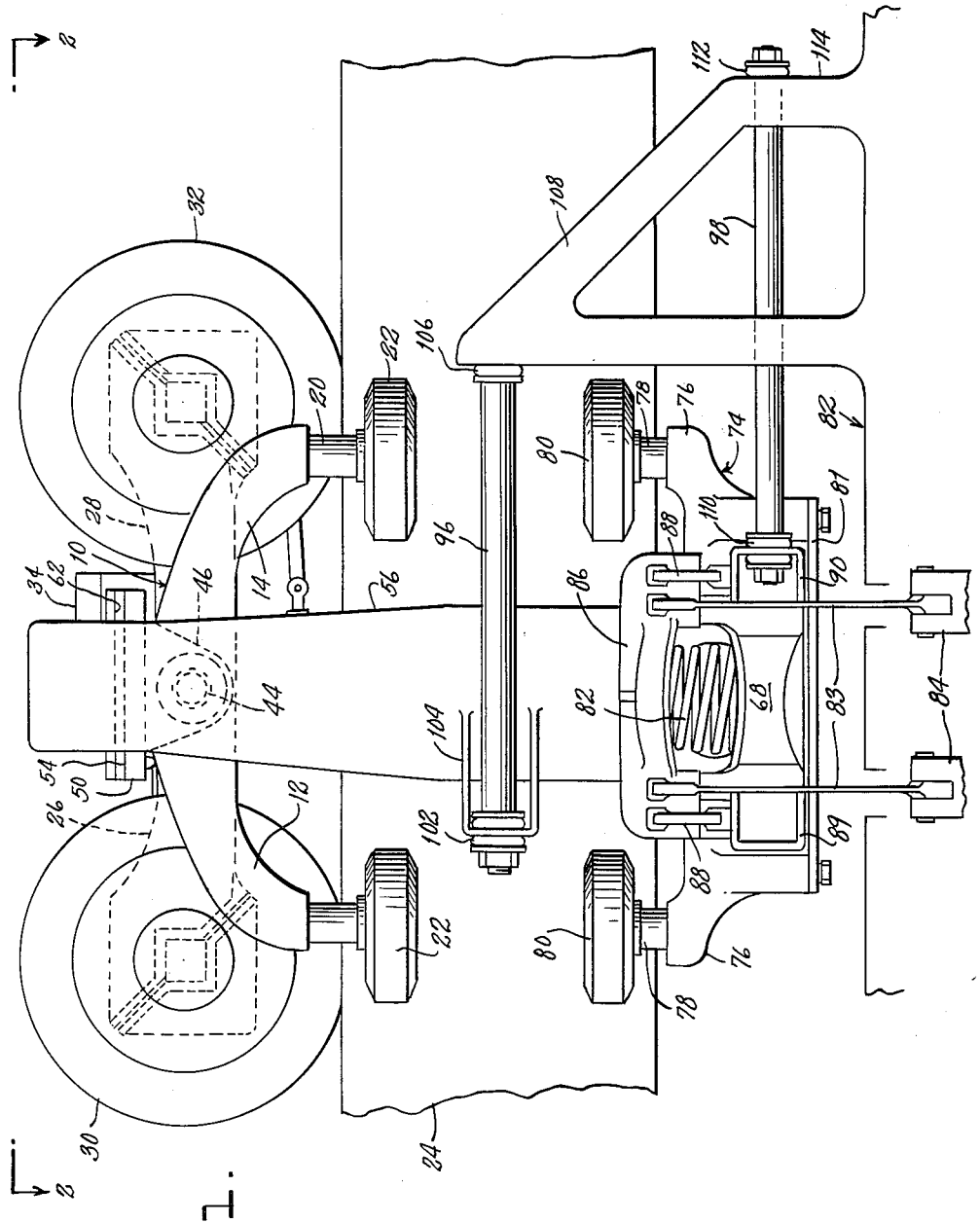
INVENTOR.
SIDNEY H. BINGHAM
BY Darby & Darby
ATTORNEYS June 4, 1963  S. H. BINGHAM  3,092,040
MONORAIL CONSTRUCTIONS
Filed Jan. 22, 1960  3 Sheets-Sheet 2
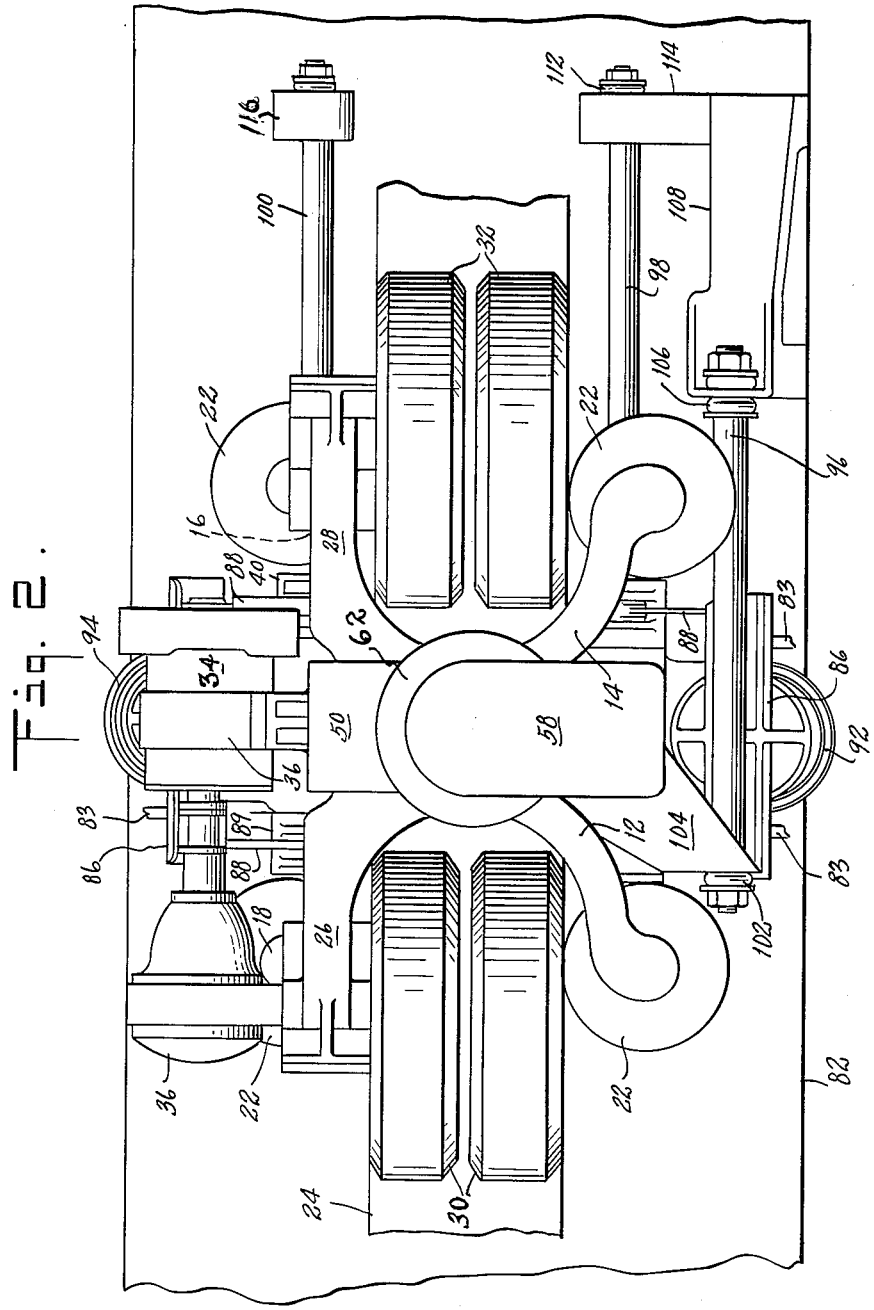
INVENTOR.
SIDNEY H. BINGHAM
BY Darby & Darby
ATTORNEYS June 4, 1963  S. H. BINGHAM  3,092,040
MONORAIL CONSTRUCTIONS
Filed Jan. 22, 1960  3 Sheets-Sheet 3
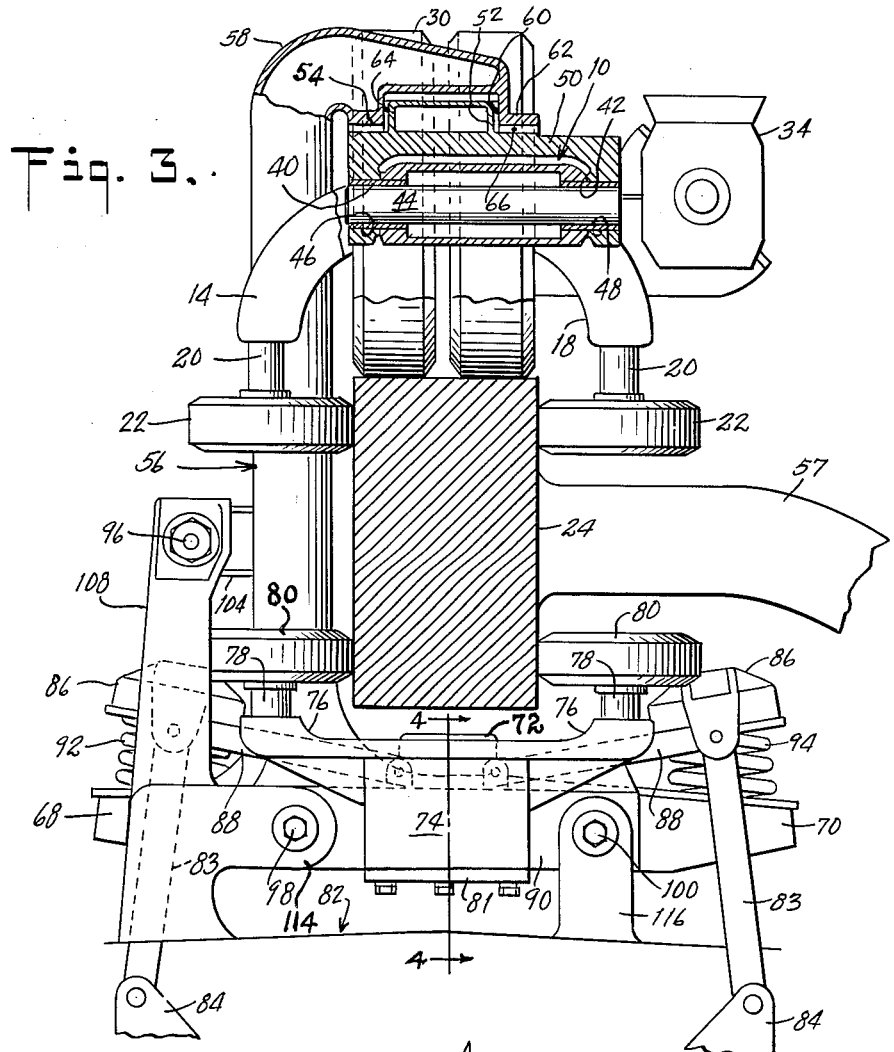
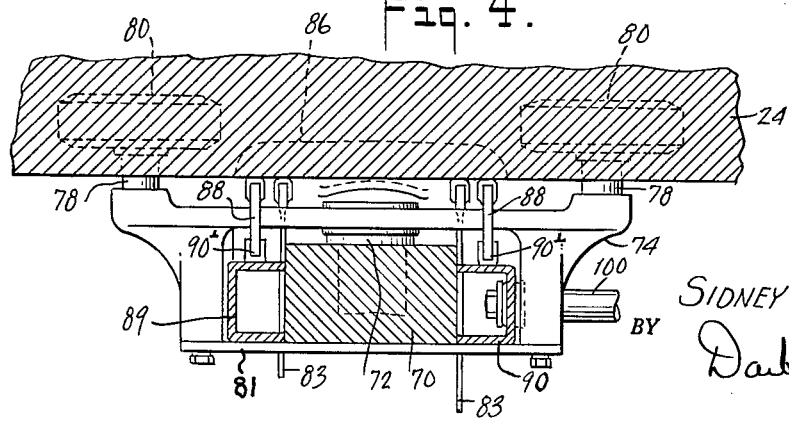
INVENTOR.
SIDNEY H. BINGHAM
BY Darby & Darby
ATTORNEYS United States Patent Office 3,092,040
Patented June 4, 1963

3,092,040
MONORAIL CONSTRUCTIONS
Sidney H. Bingham, 109 E. 35th St., New York, N.Y.
Filed Jan. 22, 1960, Ser. No. 4,042
8 Claims. (Cl. 105—150)

This invention relates to monorail vehicles and more particularly to novel trucks and suspension assemblies for such vehicles.

In recent years two basic types of monorail systems have been evolved, i.e. the overrunning system in which the center of gravity of the vehicle is above the track beam and the suspended system in which the vehicle is disposed beneath the track beam. It is the latter system with which the present invention is primarily concerned.

In the suspended monorail system the running gear for the monorail cars comprises two truck assemblies mounted respectively at opposite ends of the car body from which the car body is suspended asymmetrically. Since the trucks are disposed adjacent the opposite ends of the car, the connection between the trucks and the car must be arranged to allow pivotal movement of the trucks to permit the car to negotiate a curve. Further, to provide a comfortable ride, the car body must be spring suspended from the trucks in such a manner as to permit relative vertical movement between the car and the trucks and to permit limited relative tilting movement between the car and the trucks. At the same time a rigid drive connection must be maintained between the trucks and the car to permit the efficient transmission of braking and accelerating forces from the truck to the car without inhibiting the required relative motion between the truck and the car.

It is the principal purpose and object of the present invention to provide improved monorail truck and suspension systems satisfying these requirements.

It is a further object of the present invention to provide improved truck and suspension apparatus for monorail vehicles which are uniquely effective in providing a comfortable yet stable ride.

Additional objects and advantages will become apparent as the description proceeds in connection with the accompanying drawings in which:

FIGURE 1 is a side elevation of a truck and suspension system constructed in accordance with the present invention;

FIGURE 2 is a top plan view of the apparatus of FIGURE 1 looking in the direction of the arrows 2 in FIGURE 1;

FIGURE 3 is an end elevation of the truck and suspension system of FIGURES 1 and 2; and FIGURE 4 is a fragmentary section of the lower portion of the truck taken along line 4—4 of FIGURE 3.

As stated above, the running gear for the monorail car with which the present invention is concerned comprises two truck assemblies positioned at opposite ends of the car. Since the truck assemblies are identical, only one such truck is shown in the drawings and will be described.

The truck assembly comprises an upper frame structure indicated generally at 10 having four symmetrically arrange arms 12, 14, 16 and 18, which project generally radially outwardly and downwardly from the central portion of the frame. The outer extremities of each of these arms carry vertically extending axles 20 which rotatably support four identical upper guide wheels 22. The wheels 22 are symmetrically arranged and engage the upper side surface of the beam 24.

The truck frame assembly 10 also includes arms 26 and 28 which project forwardly and rearwardly, respectively, from the central section of the frame 10 at one side of the track beam 24. Mounted adjacent the outer extremities of the arms 26 and 28 are axles (not shown) which rotatably support front and rear main load carrying wheels 30 and 32. While both sets of wheels 30 and 32 may be driven, in the form of the invention shown only the wheels 30 are driven, the wheels 32 being idler wheels.

Conveniently, the wheels 30 are driven by an electric motor 34 rigidly supported on a lateral extension 36 of the main frame 10, the motor 34 being drivingly connected to the wheels 30 through a bevel gear drive enclosed in housing 36 which is rigidly carried by the forward arm 26. Preferably both sets of wheels 30 and 32 are provided with conventional automotive type brakes.

The central portion of the truck frame 10 is provided with transverse aligned bores 40 and 42 in which a pivot pin 44 is journalled, suitable bearing bushings being provided for this purpose. The projecting ends of the pin 44 extend through aligned bores 46 and 48 formed in downwardly projecting ears provided on a secondary frame member 50. A vertical cylindrical pivot post 52 projects upwardly from the upper surface of the member 50 and is surrounded by a flat annular bearing surface 54.

A tubular hanger arm assembly 56, the main body of which extends downwardly along the side of the track beam 24 opposite to the side to which the track support columns 57 are attached, is provided at its upper end with an elbow 58 extending over the top of the track. The elbow 58 is provided with a cylindrical recess 60 which fits over the pivot post 52 and with an annular bearing area 62 opposite the annular bearing area 54. Suitable plastic low friction bearing members 64 and 66 are interposed between the parts to facilitate the required relative rotary movement.

From the foregoing it will be apparent that the truck frame 10 is free to pivot with respect to the hanger arm 56 about a horizontal axis transverse to the beam and about a vertical axis located centrally of the beam while relative lateral and longitudinal movement is prevented.

The lower end of the hanger arm 56 is provided with lateral extensions 68 and 70, the latter extending transversely across the undersurface of the track beam 24 and the outer ends of the extensions 68 and 70 being disposed symmetrically with respect to the central vertical axis of the track beam 24. The extension 70 is provided with a pivot construction indicated generally at 72, the axis of which is aligned with the central vertical axis of the beam 24 and with the axis of the upper pivot post 52. Pivotally supported by the pivot assembly 72 is a spider 74 having four projecting arms 76, each of which carries a stub axle 78 which rotatably carry lower guide wheels 80 which travel along the lower side surfaces of the track beam 24 preferably directly beneath the upper guide wheels 22. The spider 74 is held in place on the pivot by a lower plate 81.

The car body indicated generally at 82 is suspended from the hanger assembly 56 by four links 83, the lower ends of which are pivotally secured to the car on suitable mounts 84. The upper ends of the links are pivotally secured to spring cups 86 which are rigidly secured to levers 88, the inner ends of which are pivotally mounted at 90' on C-shaped beams 89 and 90 welded to the hanger extension 70. As shown in FIGURE 1, two such levers 88 are provided for each spring cup 86. Heavy coil springs 92 and 94 are compressed between the spring cups 86 and the hanger extensions 68 and 70, respectively. The two springs 92 and 94, together with corresponding springs in the truck at the opposite end of the car support the entire weight of the car body.

The inclination of the suspension links 83 upwardly and inwardly as shown in FIGURE 3 effectively limits side sway of the vehicle while permitting limited tilting movement of the car body.

It is a feature of the invention that springs 92 and 94 absorb only vertical loads. All other loads due to acceleration and braking are taken by three drag rods 96, 98 and 100. Drag rod 96 is connected by rubber shock mounts 102 to a bracket 104 rigidly secured to the hanger arm assembly opposite the vertical midpoint of the track beam 24. At its opposite end the drag rod 96 is secured by similar rubber shock mounts 106 to a bracket 108 which projects upwardly from the car body 82. The drag rod 98 is secured at its forward end by shock mount 110 to the beam 90 and at its rearward end is secured by suitable rubber hsock mounts 112 to an arm 114 of the bracket 108. The third drag rod 100 is secured by rubber shock mounts to a bracket 116 projecting upwardly from the car body 80 opposite the bracket 108 and to the beam 90.

The respective rubber shock mounts permit limited angular displacement of the rods necessary to accommodate the relative motion between the car body and the hanger assembly permitted by the springs 92 and 94. Thus the drag rods are not subjected to shear stresses.

The load applied to the drag rods are tension and compression loads only. When the vehicle is in motion, all of the rods will be loaded in the same manner, either in tension or compression depending upon the direction of travel of the vehicle. During braking the forces will be reversed and under some conditions of rapid acceleration or deceleration the upper rod will be loaded in one manner and the two lower rods loaded in the opposite manner.

The invention may be embodied in other specific forms without departing from the spirit or essential caracteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A truck and suspension apparatus for supporting a monorail car body for passage along a track beam having an upper running surface and side running surfaces comprising hanger assemblies extending vertically along a side surface of said track beam and having upper and lower portions projecting laterally above and below said track beam respectively, truck frame assemblies rotatably carrying main wheels for passage along said top running surface and upper guide wheels for passage along the upper portion of said side track beam running surfaces, means connecting said frame assemblies to said upper portion of said hanger arm assemblies, lower guide wheels, means connecting said lower guide wheels to said lower portion of said hanger arm assemblies, springs suspending said car body from said lower portion of said hanger arm assemblies, and a plurality of drag rods, one lying in a plane above the others, extending longitudinally of said car body and said track beam and connected at their opposite ends, respectively, to said hanger arm assemblies and said car body and arranged to transmit between said hanger arm assemblies and said car body all loads acting longitudinally of said car body.

2. A truck and suspension apparatus for supporting a monorail car body for passage along a track beam having an upper main running surface and side running surfaces comprising hanger arm assemblies extending along the side surface of said track beam and having upper and lower portions projecting laterally above and below said track beams respectively, truck frame assemblies, main load carrying wheels carried by said frame assemblies for passage along said upper running surface of said track beam, upper guide wheels carried by said frame assemblies for passage along the upper portion of said side running surfaces, means connecting said frame assemblies to said upper portion of said hanger arm assemblies, lower guide wheels, means mounting said lower guide wheels on the lower projecting portion of said hanger arm assemblies for passage along the lower portion of said side running surfaces, spring assemblies carried by said lower portion of said hanger arm assemblies at opposite sides of said track beam for suspending said car body from said hanger arm assemblies, upper drag rods each connected at its opposite ends to each of said hanger arm assemblies and said car body and extending longitudinally of said track beam along a side surface thereof substantially adjacent the vertical midpoint of said track beam, and a pair of additional drag rods connected at their opposite ends, respectively, to a lower portion of each of said hanger arm assemblies and said car body on opposite sides of said track beam and extending longitudinally of said track beam beneath the lower surface thereof, said drag rods effectively transmitting between said hanger arm assemblies and said car body all forces acting longitudinally of said car body.

3. A suspension apparatus for supporting a monorail car for passage along a rigid track beam comprising hanger arm assemblies longitudinally spaced along and lying parallel to the vertical axis of said beam, main wheel assemblies and guide wheel assemblies mounted in vertically spaced relation on said hanger assemblies respectively, main and guide wheels journaled on said wheel assemblies for travel along the faces of said track beam, means spring suspending said car from said hanger arm assemblies below said beam, and a plurality of drag rods interconnecting said hanger assemblies to said car body at points spaced longitudinally of said beam, said drag rods extending longitudinally of said track beam and said car body and arranged to transmit all loads acting between said car body and said hanger arm assemblies longitudinally of said beam.

4. In the combination of claim 3, said drag rods being pivotally connected at their respective ends to said hanger arm assemblies and car body.

5. In the combination of claim 3, said main wheel assemblies and guide wheel assemblies including truck frame assemblies being pivotally mounted on said hanger arm assemblies on which said wheels are journaled.

6. In the combination of claim 3, said main wheel assemblies and guide wheel assemblies including truck frame assemblies being pivotally mounted on said hanger arm assemblies on which said wheels are journaled, said pivotal mounting permitting pivotal movement of said truck assemblies with respect to said hanger arm assemblies on a vertical axis.

7. In the combination of claim 3, said main wheel assemblies and guide wheel assemblies including truck frame assemblies being pivotally mounted on said hanger arm assemblies on which said wheels are journaled, said pivotal mounting permitting pivotal movement of said truck assemblies with respect to said hanger arm assemblies on a horizontal axis.

8. In the combination of claim 3, said main wheel assemblies and guide wheel assemblies including truck frame assemblies being pivotally mounted on said hanger arm assemblies on which said wheels are journaled, said pivotal mounting permitting pivotal movement of said truck assemblies with respect to said hanger arm assemblies on vertical and horizontal axes.

References Cited in the file of this patent

UNITED STATES PATENTS

| | | |
|---|---|---|
| 450,813 | Lamb et al. | Apr. 21, 1891 |
| 843,418 | Romanoff | Feb. 5, 1907 |
| 1,152,564 | Smith | Sept. 7, 1915 |
| 2,060,402 | Strauss | Nov. 10, 1936 |
| 2,469,069 | Grazier | May 3, 1949 |
| 2,623,475 | Fraser | Dec. 30, 1952 |
| 2,676,550 | Burdick | Apr. 27, 1954 |
| 2,834,302 | Nixon | May 13, 1958 |